Figure 1:
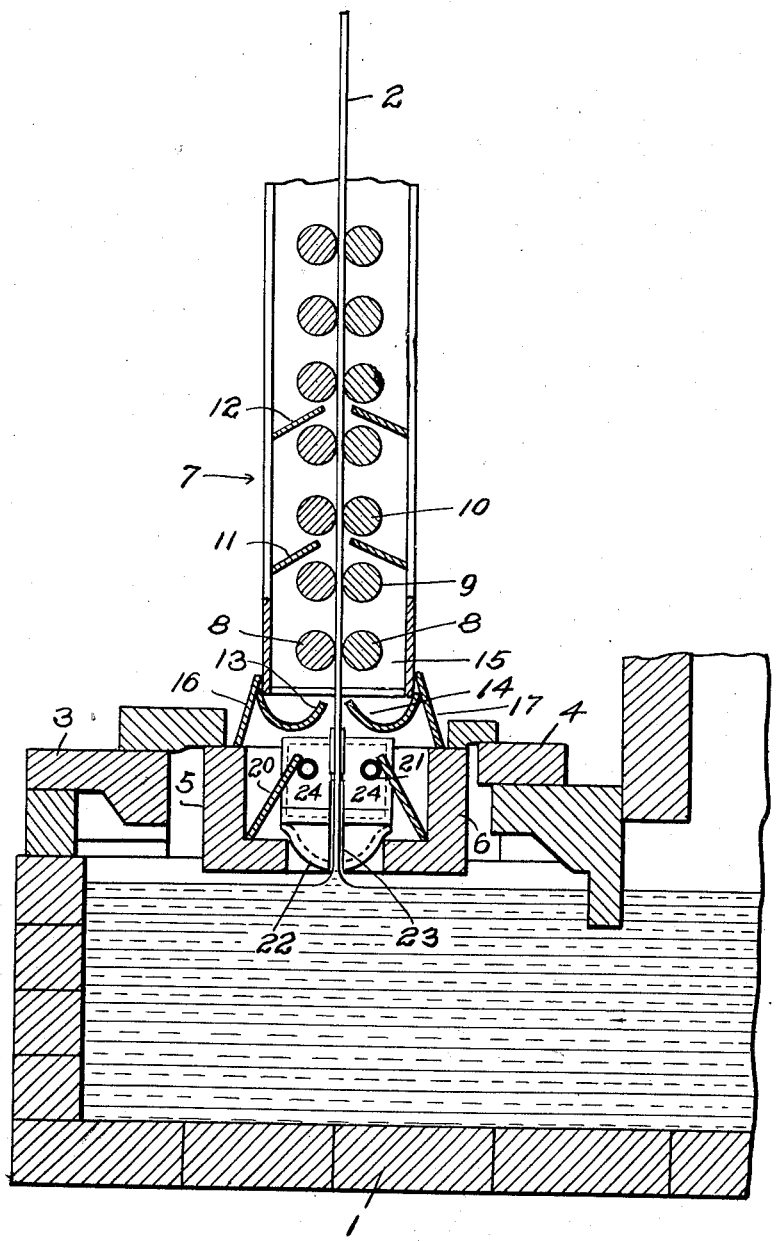

Feb. 1, 1927.

C. H. WRIGHT 1,615,863

APPARATUS FOR MAKING SHEET GLASS

Filed May 24, 1926    2 Sheets-Sheet 1

INVENTOR
Charles H. Wright
by
James C. Bradley

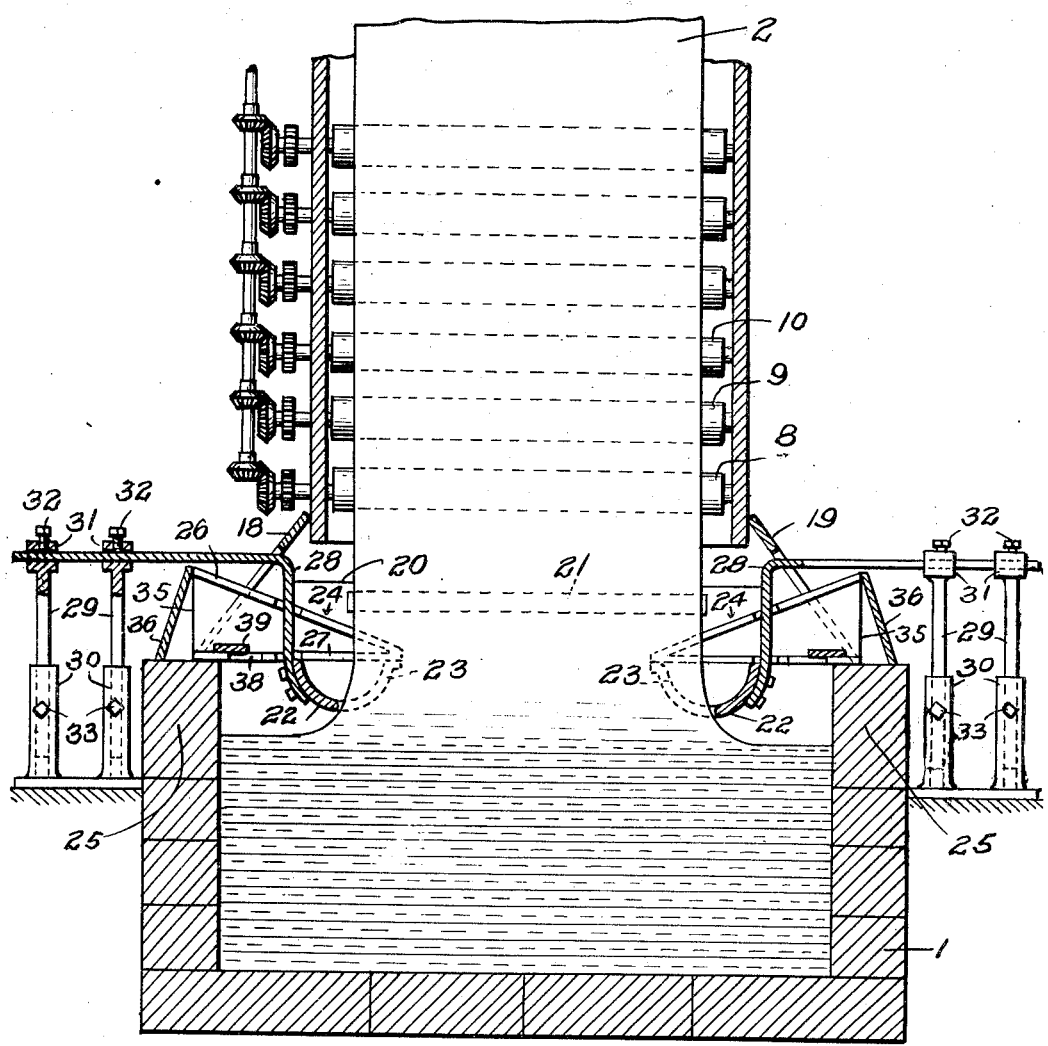
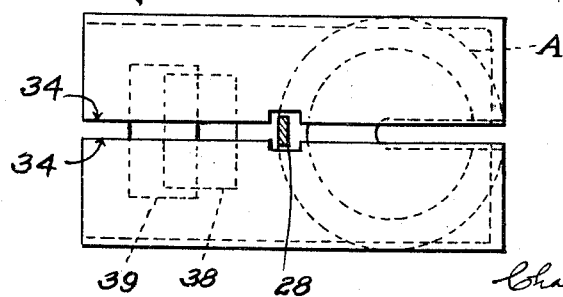

Patented Feb. 1, 1927.

1,615,863

UNITED STATES PATENT OFFICE.

CHARLES H. WRIGHT, OF CLARKSBURG, WEST VIRGINIA, ASSIGNOR TO PITTSBURGH PLATE GLASS COMPANY, A CORPORATION OF PENNSYLVANIA.

APPARATUS FOR MAKING SHEET GLASS.

Application filed May 24, 1926. Serial No. 111,096.

The invention relates to apparatus for making sheet glass, applicable where a continuous sheet is drawn from an open pool or bath; and involves an improvement on the edge holding means of the type disclosed in the patent to H. G. Slingluff No. 1,549,513 of August 11, 1925. When this type of edge holding devise is used over a pool surrounded by enclosing walls, which cut down the radiation of heat from the concave slotted plates, there is a tendency of the edges of the glass to pull away from the plates. The object of the invention is to provide an improved means for overcoming this difficulty, without the necessity of providing pipes and circulating means for supplying air or water to the edge holders for cooling them. One embodiment of the invention is illustrated in the accompanying drawings, wherein:

Figure 1 is a vertical section through the apparatus. Fig. 2 is a vertical section taken at right angles to the section of Fig. 1. And Fig. 3 is a plan view of one of the cooling boxes employed, the relative position of the convex shielding plate or bowls being indicated by the dotted line figure marked A.

Referring to the drawings, 1 is a forehearth or drawing tank connected with a melting tank, preferably of the regenerator type from which the glass sheet or ribbon 2 is drawn continuously. The surface of the bath in the forehearth is partially covered over by means of the plates 3 and 4 and the L-blocks 5 and 6. Mounted above the opening between the L-blocks is the leer 7, which carries the means for drawing the glass continuously upward from the bath. The means employed for drawing the glass sheet preferably comprises a series of pairs of rollers 8, 9, 10, etc. driven by suitable means and made up either of asbestos discs or of central supporting members covered with asbestos. The rolls lying on one side of the sheet are preferably fixed against lateral movement, while the rollers on the other side are yieldingly pressed against the sheet by means of counterweighted levers, as is well known in the art. Any other suitable drawing means might be employed.

The leer is divided into a series of compartments by means of the inclined baffle plates 11, 12, etc., and the temperature of these compartments decreases progressively upward, so that the glass is gradually cooled and annealed as it passes through the leer, being cut into separate sheets as it emerges from the upper end of the leer. At the lower end of the leer is a pair of plates 13 and 14 of the shape indicated in Fig. 1, such plates acting as a partial closure for the compartment 15 at the bottom of the leer and also serving to catch any broken glass falling from this compartment. The space beneath the leer into which the glass sheet is drawn is closed in by means of the end plates 16 and 17 and the side plates 18 and 19, and the glass is further shielded by means of the inclined plates 20 supported at their lower ends upon the L-blocks 5 and 6 and resting at their upper ends against the transverse water cooled pipes 21.

The edge holding devices comprise the dish-shaped members 22, slotted as indicated at 23, and located adjacent the surface of the bath. These members are preferably made of cast iron or cast steel and are relatively thick and heavy. In service they become red hot and act as reflectors, maintaining the areas of glass therebeneath considerably hotter than would otherwise be the case. The slots 23 are somewhat wider than the thickness of the glass and the contact between the glass and the edge of the slots is relatively slight. There is, however, sufficient adherence to prevent the edge of the sheet from working inward during the drawing operation, unless the metal reaches too high a temperature, in which case, the devices will release their hold upon the edges of the sheet and permit it to narrow. This overheating will not ordinarily occur, if the space between the L-blocks and the lower end of the leer is not closed in, but when such space is closed in, as is done by the use of the plates 16, 17, 18 and 19, this overheating and release of the edges occurs. This condition is taken care of by the use of the boxes or conduits 24, 24 supported at their rear ends upon the walls 25, 25 of the tank and at their forward ends upon the dish-shaped members or plates 22.

The boxes or conduits 24 are preferably made of sheet metal and are triangle in cross section, as indicated in Fig. 2, the walls 26 and 27 being slotted in order to permit the passage of the handles 28, 28 which support the members 22. These extend to the rear and are adjustably supported in the bars 29, 29 slidably supported in the standards 30, 30. The handles may be adjusted longitudinally through the enlargements 31, 31 carried at the upper ends of the bars 29, 29 and are secured in adjusted position by means of the screws 32, 32. The bars 29, 29 are themselves held in any desired position of vertical adjustment by means of the set screws 33, 33. The method of supporting the handle adjustably constitutes no part of the present invention and any suitable means may be employed for giving the handles an adjustable support.

The boxes 24, 24 are each preferably formed in two similar sections, being split vertically, as indicated in Fig. 3, in which the lines 34, 34 indicate the opposing inner faces of the two half sections. This division of the boxes into two parts provides for their ready positioning in position of use and their removal therefrom. The rear ends of the boxes are open, as indicated at 35, but this amount of opening may be regulated by means of plates 36 resting at their lower edges upon the walls 25. By moving the lower ends of these plates, the cooling effect of the boxes may be regulated to suit conditions. The lower walls 27 of the boxes are also provided with openings 38 which may be closed to any desired degree by means of plates 39, thus providing a means for regulating the temperature of the glass bath therebeneath.

As indicated in Fig. 3, the outer open ends of the triangular boxes extend through the plates 18 and 19 so that the interiors of the boxes may be cooled from the air outside of the inclined chamber through which the glass sheet is drawn. These devices, therefore, provide for a certain amount of cooling of the convex drawing plates or bowls 22 and the degree of cooling may be regulated by positioning the plates 36 at varying degrees of inclination. When the members 22 are thus cooled to the desired degree, the tendency of the edges of the glass sheet to pull away from the members is avoided as the degree of adherence between the metal and the glass increases as the temperature of the members 22 decreases. The cooling boxes 24, 24 thus give the desired regulation of the temperature of the members 22 without the use of cooling pipes with fluids circulated therethrough, such as have heretofore been employed.

What I claim is:

1. In combination with apparatus arranged to draw a glass sheet from an open pool of molten glass through a drawing chamber, of means in the chamber for preventing inward movement of the edge of the sheet, comprising a shielding plate spaced above the surface of the pool but closely adjacent thereto and having a slot extending inward from its edge and fitting around the edge of the sheet, and a cooling member comprising a box having an opening at its outer end and extending into said drawing chamber with its inner end positioned immediately above said plate.

2. In combination with apparatus arranged to draw a glass sheet from an open pool of molten glass through a drawing chamber, of means in the chamber for preventing inward movement of the edge of the sheet, comprising a shielding plate spaced above the pool but closely adjacent thereto and having a slot extending inward from its edge and fitting around the edge of the sheet, and a cooling member comprising a box of triangular shape in vertical cross section extending into said drawing chamber with its larger end open and lying outside the chamber, and with its inner smaller end positioned immediately above said plate.

3. In combination with apparatus arranged to draw a glass sheet from an open pool of molten glass through a drawing chamber, of means in the chamber for preventing inward movement of the edge of the sheet, comprising a shielding plate spaced above the surface of the pool but closely adjacent thereto and having a slot extending inward from its edge and fitting around the edge of the sheet, a cooling member comprising a box having an opening at its outer end and extending into said drawing chamber with its inner end positioned immediately above said plate, and adjustable closure means for said outer end of the box.

4. In combination with apparatus arranged to draw a glass sheet from an open pool of molten glass through a drawing chamber, of means in the chamber for preventing inward movement of the edge of the sheet, comprising a shielding plate spaced above the surface of the pool but closely adjacent thereto and having a slot extending inward from its edge and fitting around the edge of the sheet, a cooling member comprising a box having an opening at its outer end and another opening through its lower side, and extending into said drawing chamber with its inner end positioned immediately above said plate, and adjustable closure means for said outer end and for the opening through the lower side of the box.

5. In combination with apparatus arranged to draw a glass sheet from an open pool of molten glass through a drawing chamber, of means in the chamber for preventing inward movement of the edge of the sheet, comprising a shielding plate spaced above the surface of the pool but closely adjacent thereto and having a slot extending inward from its edge and fitting around the edge of the sheet, and a cooling member comprising a box of triangular shape in vertical cross section extending into said drawing chamber with its larger end open and lying outside the chamber, and with its inner smaller end position immediately above said plate, said box being divided longitudinally in a vertical plane into two separable sections.

In testimony whereof, I have hereunto subscribed my name this 4th day of May, 1926.

CHARLES H. WRIGHT.